(12) United States Patent
Uchida et al.

(10) Patent No.: US 7,489,470 B2
(45) Date of Patent: Feb. 10, 2009

(54) MAGNETIC RECORDING APPARATUS

(75) Inventors: Hiroshi Uchida, Kanagawa (JP); Mirei Hosono, Kanagawa (JP); Hideki Ohzeki, Kanagawa (JP); Tetsuo Ueda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/725,038

(22) Filed: Mar. 15, 2007

(65) Prior Publication Data
US 2007/0230025 A1    Oct. 4, 2007

(30) Foreign Application Priority Data
Mar. 29, 2006    (JP)    ............... 2006-092408

(51) Int. Cl.
   *G11B 5/596*    (2006.01)
(52) U.S. Cl. .................. 360/77.04; 360/77.07
(58) Field of Classification Search .................. None
   See application file for complete search history.

(56) References Cited

U.S. PATENT DOCUMENTS 6,549,349 B2 * 4/2003 Sri-Jayantha et al. ......... 360/31
6,950,268 B2 * 9/2005 Inoue et al. ............... 360/77.07
7,054,094 B2 * 5/2006 Zhang et al. .............. 360/77.02
7,085,094 B1 * 8/2006 Heimbaugh et al. ....... 360/77.04

FOREIGN PATENT DOCUMENTS

JP    2001-126421    5/2001

* cited by examiner

*Primary Examiner*—Jason C Olson
(74) *Attorney, Agent, or Firm*—Townsend and Townsend and Crew LLP; John Henkhaus

(57) ABSTRACT

Embodiments of the present invention provide a magnetic recording apparatus capable of generating RRO compensation information that can expand the disturbance frequency range in which to compensate for RRO. Embodiments of the present invention describe a magnetic recording apparatus that uses a plurality of repetitive control systems to detect repeatable runout during the rotation of a magnetic recording medium for a frequency characteristic of each of the repetitive control systems. The magnetic recording apparatus further generates compensation information to compensate for each of the detected repeatable runout. The magnetic recording apparatus still further writes the compensation information generated for each of the repetitive control systems to a servo signal, thus suppressing and controlling the repeatable runout.

3 Claims, 6 Drawing Sheets

| Servo ID | $\beta 1$ | $\beta 2$ |
|---|---|---|
| 0 | a a a a | b b b b |
| 1 | c c c c | d d d d |
| ⋮ | ⋮ | ⋮ |

US 7,489,470 B2

MAGNETIC RECORDING APPARATUS

CROSS-REFERENCE TO RELATED APPLICATION

The instant nonprovisional patent application claims priority to Japanese Patent Application No. 2006-092408 filed Mar. 29, 2006 and incorporated by reference in its entirety herein for all purposes.

BACKGROUND OF THE INVENTION

In a magnetic recording apparatus such as a hard disk apparatus, a plurality of tracks are formed in a concentric manner on a disk-shaped magnetic recording medium so as to record data on the tracks. In this case, a servo signal is formed on each of the tracks to specify the center of the track so as to control the position of a magnetic head adapted to read and write data.

Techniques are capable of reducing repeatable runout (hereinafter referred to as "RRO") caused by the rotation of a magnetic recording medium by using information adapted to compensate for RRO (RRO compensation information) that has been written in advance to part of the servo signal.

This RRO compensation information varies from one cylinder to another and from one head to another, thus resulting in an enormous amount of such information to be produced for the entire magnetic recording medium. Therefore, a method is desired for determining the RRO compensation information quickly and with high accuracy.

Conventionally, two methods are known to generate the RRO compensation information, namely, a method operable to estimate the RRO compensation information using a control target model and another using repetitive control. Of these, the method using a control target model requires designing a highly accurate model for each hard disk drive, thus resulting in a low productivity due to the need to perform calibration for each hard disk drive.

On the other hand, the method using repetitive control leads to a wider disturbance frequency range in which to compensate for RROs. This requires designing a phase-stable repetitive control system suitable for the characteristics of a servo system over a wide frequency range. However, it's not been developed yet that a theoretical method to get such a repetitive control system.

BRIEF SUMMARY OF THE INVENTION

Embodiments of the present invention disclose a magnetic recording apparatus that uses a plurality of repetitive control systems to detect repeatable runout (RRO) during the rotation of a magnetic recording medium for a frequency characteristic of each of the repetitive control systems. The magnetic recording apparatus further generates compensation information to compensate for each of the detected repeatable runout. The magnetic recording apparatus still further writes the compensation information generated for each of the repetitive control systems to a servo signal, thus suppressing and controlling the repeatable runout.

BRIEF DESCRIPTION OF THE DRAWINGS

FIG. 5 is an explanatory view showing an example of information written in the course of the generation of the RRO compensation information by the magnetic recording apparatus according to an embodiment of the present invention.

DETAILED DESCRIPTION OF THE INVENTION

Embodiments in accordance with the present invention relate to a magnetic recording apparatuses such as hard disk apparatus. An object of embodiments of the present invention to provide a magnetic recording apparatus capable of generating RRO compensation information that can expand the disturbance frequency range in which to compensate for RRO.

Embodiments of the present invention disclose a magnetic recording apparatus that includes a magnetic recording medium having tracks formed in a concentric or spiral manner and having at least one servo signal recorded on each track. The magnetic recording apparatus further includes a spindle motor adapted to rotate the magnetic recording medium, a magnetic head provided to be movable in the approximately radial direction of the magnetic recording medium and positioned over one of the tracks formed on the magnetic recording medium so as to read signals including the servo signal at the position. The magnetic recording apparatus still further includes a compensation information generating circuit. The compensation information generating circuit is adapted to feed a position error signal of the magnetic head relative to the track, based on the servo signal read by the magnetic head, to each of a plurality of repetitive control systems each having a frequency characteristic different from each other. The compensation information generating circuit is further adapted to use the repetitive control systems to detect repeatable runout during the rotation of the magnetic recording medium for the frequency characteristic of each of the repetitive control systems. The compensation information generating circuit is still further adapted to generate individual compensation information so as to compensate for each of the detected repeatable runout. The magnetic recording apparatus writes compensation information, based on the individual compensation information and generated for each of the repetitive control systems, to the servo signal so as to suppress and control the repeatable runout.

Figure 1:
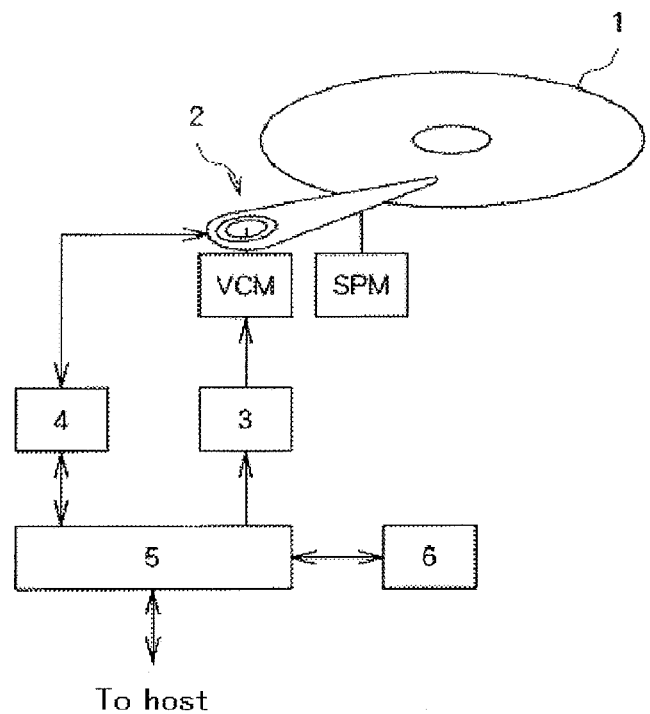
FIG. 1 is a schematic configuration of a magnetic recording apparatus according to an embodiment of the present invention.

A preferred embodiment of the present invention will be described with reference to the accompanying drawings. The magnetic recording apparatus according to one embodiment of the present invention is configured to include a disk-shaped magnetic recording medium 1, a magnetic head unit 2, a driver 3, an R/W (read/write) circuit 4, a control circuit 5 and a storage unit 6 as shown in FIG. 1.

The magnetic recording medium 1 is rotated with the center thereof as the axis of the rotation by a spindle motor SPM. Further, a plurality of tracks is formed in a concentric manner on the magnetic recording medium 1. Data is recorded along the tracks.

Figure 2:
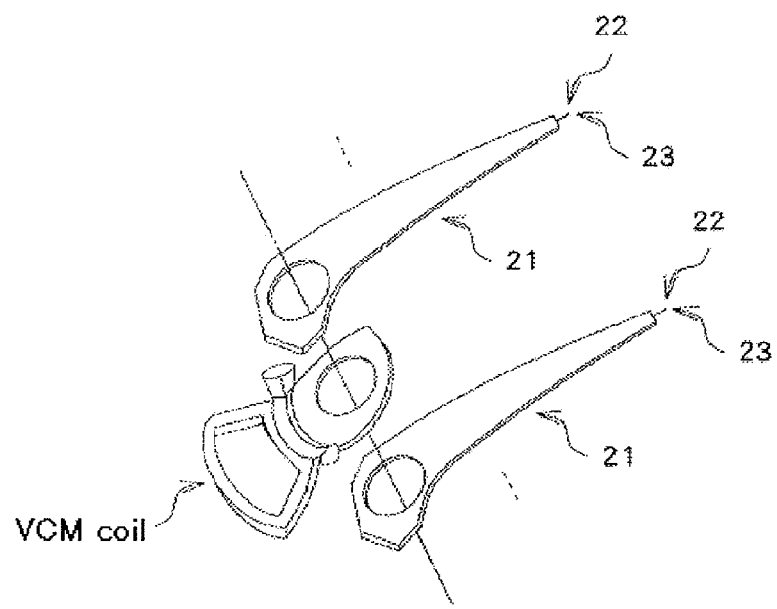
FIG. 2 is a schematic diagram showing an example of a partial structure of a magnetic head unit in the magnetic recording apparatus according to an embodiment of the present invention.

The magnetic head unit 2 is configured to include at least one arm 21. As shown in the schematic configuration of the arms 21 in FIG. 2, the tip portion of each of the arms 21 are provided with a write head 22 adapted to write data by magnetizing the magnetic recording medium 1, and a read head 23 adapted to read data by detecting the magnetization condition of the magnetic recording medium 1. The magnetic head unit 2 is disposed near the magnetic recording medium 1 and rotated by the driver 3 within a predetermined range of angles around a given rotational center. This allows the write head 22 and the read head 23 to be movable in the approximately radial direction of the magnetic recording medium 1.

The driver 3 includes a voice coil motor (VCM) adapted to rotate the magnetic head unit 2 within the predetermined range of angles around the rotational center thereof. Further, the driver 3 controls the VCM so as to control the rotational angle of the magnetic head unit 2. This allows the write head 22 and the read head 23 to move to the track positions specified by instructions supplied from the control circuit 5.

Upon receiving a write instruction and data to be written from the control circuit 5, the R/W circuit 4 modulates the data to be written and outputs the modulated data to the write head 22 of the magnetic head unit 2 so that the data is written to the magnetic recording medium 1. Further, the R/W circuit 4 demodulates a signal from the read head 23 and outputs the read data to the control circuit 5.

The control circuit 5 is, for example, a microcomputer, and operates in accordance with a program stored in the storage unit 6. The operation of the control circuit 5 will be described later. The storage unit 6 is configured to include a storage element such as a RAM (Random Access Memory) and an EEPROM (Electronically Erasable and Programmable Read Only Memory) and stores a program executed by the control circuit 5. Further, the storage unit 6 operates as a work memory of the control circuit 5.

Here, the operation of the control circuit 5 will be described. The control circuit 5 executes the processing (RRO compensation information generation processing) that involves writing RRO information as additional information to or reading the information from a servo signal (including a servo address and a servo burst) recorded in advance at a given timing during manufacturing or after shipment.

The control circuit 5 controls the positions of the write head 22 and the read head 23 using the servo address, servo burst, PRO compensation information and other information that are thus recorded as the servo signal. For example, the control circuit 5 generates a signal adapted to control the position of the write head 22 or the read head 23 based on a write or read instruction from a host computer and outputs the signal to the driver 3. At this time, the control circuit 5 exercises control so as to compensate for misalignment of the write head 22 or the read head 23 relative to the desired track using the RRO compensation information written to part of the servo signal recorded on the magnetic recording medium 1.

That is, upon receiving a read instruction from the host, the control circuit 5 exercises control so as to move the read head 23 over the track on the magnetic recording medium 1 where the information requested by the host is recorded, and outputs the information from the R/W circuit 4 to the host. Further, the control circuit 5 exercises control so as to generate and output an instruction to the driver 3 in accordance with a write instruction from the host and to move the write head 22 over the track where information is to be written, and outputs the information to be written to the R/W circuit 4.

Figure 3:
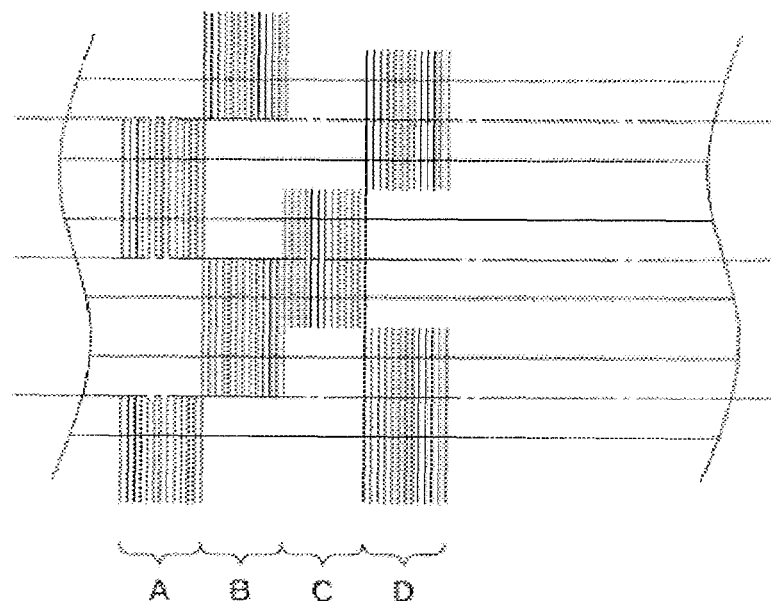
FIG. 3 is an explanatory view showing an example of burst signals contained in a servo signal.

The RRO compensation information generation processing by the control circuit 5 will be described below. It should be noted that the following description assumes that, on each track of the magnetic recording medium 1, the servo signal is recorded in advance at every given angle in the circumferential direction of the magnetic recording medium 1. Here, the servo signal includes, as shown in FIG. 3, a burst signal (A burst) A that is recorded from the center of a certain track (referred to as track of interest) to the center of the track adjacent to the track of interest on the outer perimeter side, and a burst signal (B burst) B that is recorded from the center of the track of interest to the center of the track adjacent to the track of interest on the inner perimeter side.

Figure 4:
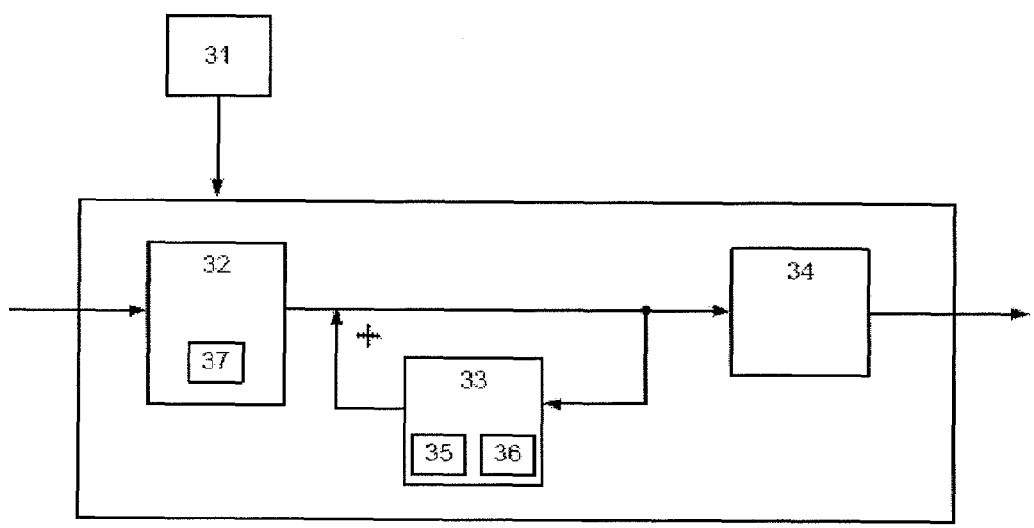
FIG. 4 is a functional block diagram of generation of RRO compensation information by the magnetic recording apparatus according to an embodiment of the present invention.

To execute the RRO compensation information generation processing, the control circuit 5 generates RRO compensation information for each track (for each cylinder and each head) using the burst signal recorded in advance on the magnetic recording medium 1. As the control circuit 5 executes the program for the RRO compensation information generation processing, the magnetic recording apparatus according to the present embodiment operates functionally as an RRO compensation information generation apparatus and is configured to include a position setting unit 31, a position error detection unit 32, a repetitive controller 33 and a controller 34, as shown in FIG. 4. Further, the repetitive controller 33 includes first and second controller elements 35 and 36.

The position setting unit 31 sequentially repeats processing steps that involve positioning the read head 23 over a desired track (track identified by unique cylinder and head numbers) and causing the repetitive controller 33 to generate RRO compensation information. Upon receiving a signal from the repetitive controller 33 indicating that the repetitive controller 33 has completed the generation of the RRO compensation information for the servo signal included in the track over which the read head 23 is positioned (referred to as current track), the position setting unit 31 moves the read head 23 over a next track.

The position error detection unit 32 records the intensities of the burst signals read by the read head 23, calculates a position error $PES=(Pa-Pb)/(Pa+Pb)$ based on an A burst read intensity Pa and a B burst read intensity Pb, and outputs the position error.

The repetitive controller 33 outputs a compensation position error signal CPE, obtained by adding the position error PES and the own output signal (may be initially "0"), to the controller 34. At the same time, the repetitive controller 33 exercises feedback control so as to bring the compensation position error signal CPE down to "0", and generates and outputs an output signal. The operation of the repetitive controller 33 will be described later.

In response to the compensation position error signal CPE from the repetitive controller 33, the controller 34 generates a signal adapted to move the magnetic head unit 2 to the position where the signal CPE becomes "0" and outputs the signal to driver 3. The controller 34 operates in the same manner as a typical servo control system. For example, the controller 34 generates a signal determining the travel direction and acceleration of the magnetic head unit 2 through calculations using a phase compensation filter and outputs the signal to the driver 3.

As described above, the control circuit 5 operates in such a manner as to cause the read head 23 to follow the track over which the read head 23 is positioned and, at the same time, causes the repetitive controller 33 to generate the RRO compensation information.

The operation of the repetitive controller 33 will be described below. In the present embodiment, the repetitive controller 33 includes two repetitive controllers, different in frequency characteristic from each other, as controller elements. In the present embodiment, an example is illustrated that includes the first and second controller elements 35 and 36.

The first and second controller elements 35 and 36 sequentially select one of the servo signals on the current track as a servo signal of interest, generates RRO compensation information for the selected servo signal of interest using a given type of filter according to a formula shown below, and writes the generated RRO compensation information to the servo signal of interest.

[Formula 1]

$$\beta_1(k-N) = \frac{\sum_{i=0}^{N} a_i \cdot z^{-1}}{1 - \sum_{i=P}^{Q} b_i \cdot z^{-(M+1)}} \cdot CPE(k) \quad (1)$$

When this processing step is complete for all the servo signals of the current track, the first and second controller elements 35 and 36 output a signal to the position setting unit 31 to inform that the generation of RRO compensation information for all the servo signals in the current track has been completed.

Using CPE(k), which is the CPE value obtained by adding the position error PES at the kth sector where the servo signal of interest is recorded and the output of the repetitive controller 33, the first controller element 35 calculates an output value $\beta_1(k-N)$ at a sector preceding by N sectors from the kth sector ((k-N)th sector) by a formula shown below.

[Formula 2]

$$\beta_1(k-N) = \sum_{i=P}^{Q} b_i \cdot z^{-(M+1)} \cdot \beta_1(k-N-M) + \sum_{i=0}^{N} a_i \cdot z^{-1} \cdot CPE(k) \quad (2)$$

Here, N is the degree of the numerator of the formula (1), and M is the number of servo signals formed per track. Further, P and Q are the values determined such that Q−P+1=N. For example, P, Q and N may be set to P=−1, Q=1 and N=3.

The first controller element 35 associates $\beta_1(k-N)$ calculated here with a servo identifier (servo ID) of the servo signal of interest and stores the resulting information in the storage unit 6.

From this step onward, the position setting unit 31 continuously causes the read head 23 to follow the current track a predetermined number of laps. This allows the read head 23 to read the servo signal of interest a plurality of number of times.

The first controller element 35 obtains CPE(k) every time the servo signal of interest is read and recalculates $\beta_1(k-N)$ by the formula (2) shown below.

[Formula 2]

$$\beta_1(k-N) = \sum_{i=P}^{Q} b_i \cdot z^{-(M+1)} \cdot \beta_1(k-N-M) + \sum_{i=0}^{N} a_i \cdot z^{-1} \cdot CPE(k) \quad (2)$$

Here, $\beta_1(k-N-M)$ represents $\beta_1(k-N)$ stored in the storage unit 6 at the time of the calculation. Then, the first controller element 35 overwrites new $\beta_1(k-N)$, calculated by the formula (2), with $\beta_1(k-N)$ stored in the storage unit 6, namely, $\beta_1(k-N-M)$, to update the contents of the storage unit 6.

Similarly, the second controller element 36 also calculates an output value $\beta_2(k-N)$ at a sector preceding by N sectors from the kth sector ((k−N)th sector) using CPE(k), which is the CPE value obtained by adding the position error PES at the kth sector where the servo signal of interest is recorded and the output of the repetitive controller 33, by a formula shown below.

[Formula 3]

$$\beta_2(k-N) = b_0 \cdot \beta_1(k-N-M) + \sum_{i=0}^{N} a_i \cdot z^{-1} \cdot CPE(k) \quad (3)$$

The second controller element 36 associates $\beta_2(k-N)$ calculated here with the servo identifier (servo ID) of the servo signal of interest and stores the resulting information in the storage unit 6.

From this step onward, the second controller element 36 obtains CPE(k) as many times as a predetermined number of laps every time the servo signal of interest is read, thus recalculating $\beta_2(k-N)$ by the formula (3) shown below.

[Formula 3]

$$\beta_2(k-N) = b_0 \cdot \beta_1(k-N-M) + \sum_{i=0}^{N} a_i \cdot z^{-1} \cdot CPE(k) \quad (3)$$

Here, $\beta_2(k-N-M)$ represents $\beta_2(k-N)$ stored in the storage unit 6 at the time of the calculation. Then, the second controller element 36 overwrites new $\beta_2(k-N)$, calculated by the formula (3), with $\beta_2(k-N)$ stored in the storage unit 6, namely, $\beta_2(k-N-M)$, to update the contents of the storage unit 6.

Figure 5:
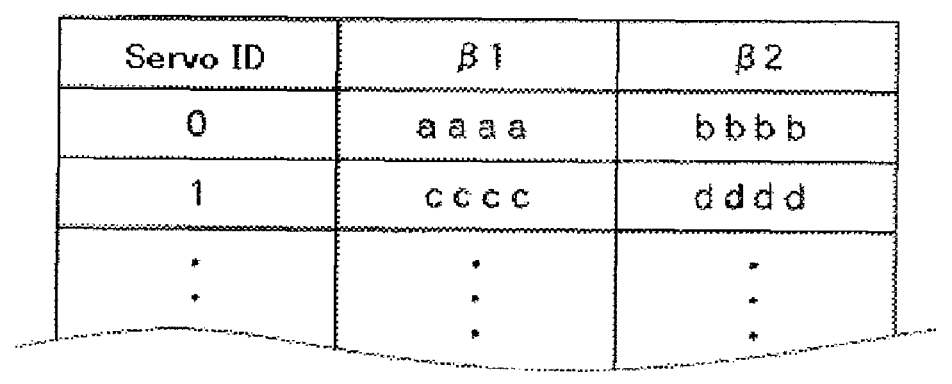

As a result, a table as shown in FIG. 5 is stored in the storage unit 6. When the RRO compensation information $\beta_1$ and $\beta_2$ for each of the servo signals included in the current track is updated as many times as the predetermined number of laps, the repetitive controller 33 calculates the target RRO compensation information $\beta(k-N)$ as $\beta(k-N)=\beta_1(k-N)+\beta_2(k-N)$, based on the RRO compensation information $\beta_1(k-N)$ and $\beta_2(k-N)$ (corresponding to the individual compensation information according to the present invention) written for each of the servo signals included in the current track. Then, the repetitive controller 33 adds the calculated $\beta(k-N)$ to the suitable servo signal (servo signal at the kth sector).

Then, the repetitive controller 33 outputs a signal to the position setting unit 31 to inform that the generation of RRO compensation information for all the servo signals in the current track has been completed.

Figure 6:
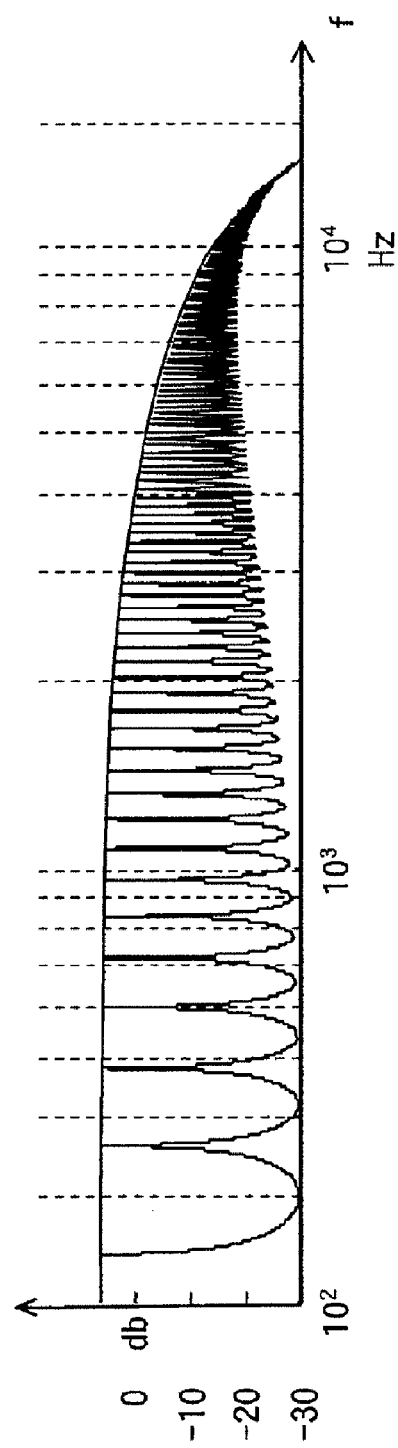
FIG. 6 is an explanatory view showing a frequency characteristic of one of a plurality of elements included in a repetitive controller of the magnetic recording apparatus according to an embodiment of the present invention.
Figure 7:
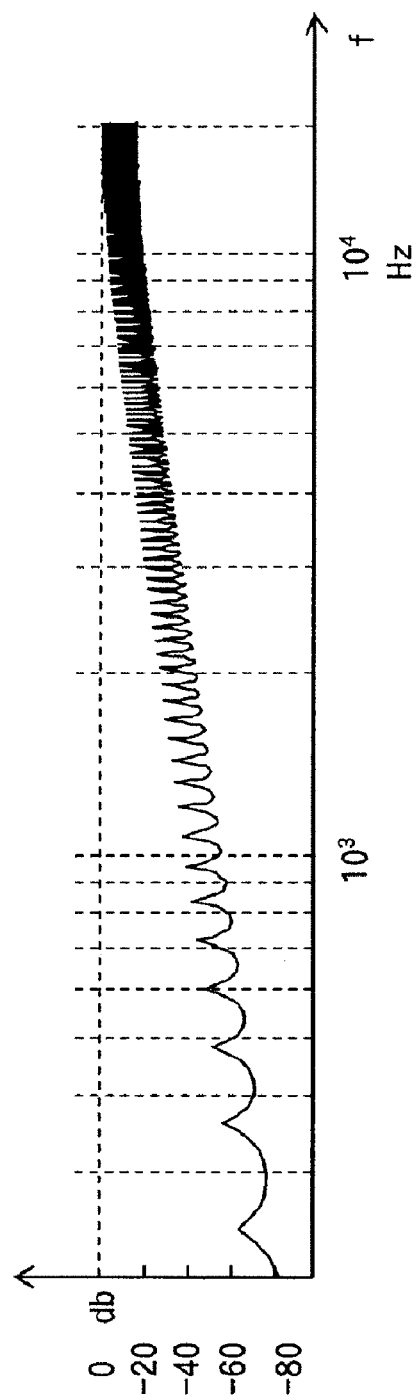
FIG. 7 is an explanatory view showing a frequency characteristic of another of the plurality of elements included in the repetitive controller of the magnetic recording apparatus according to an embodiment of the present invention.

Here, the second controller element 35 characterized by the formula (2) has a frequency characteristic obtained by multiplying a peak filter characteristic having peaks at integer multiples of the rotational frequency of the magnetic recording medium 1 (one, two, three times and so on) and a low pass filter characteristic. In this frequency characteristic, the lower the frequency, the larger the peak value at one of the integer multiples of the rotational frequency. More specifically, the frequency characteristic of the second controller element 36 is designed such that the gain declines in the high frequency region of 1 kHz or higher as shown in the Bode diagram of FIG. 6.

Further, the first controller element 36 characterized by the formula (3) has a frequency characteristic which combines a peak filter characteristic having peaks at integer multiples of the rotational frequency of the magnetic recording medium 1 (one, two, three times and so on) and a filter characteristic having a gain close to 1.0 in the high frequency region and a phase equal to 0 at frequencies that are integer multiples of the rotational frequency of the magnetic recording medium. More specifically, the first controller element 35 has a frequency characteristic in which the gain declines linearly in the low frequency region of less than 1 MHz as shown in the Bode diagram of FIG. 6.

That is, in the present embodiment, the first controller element 35 generates RRO compensation information for RRO components in the relatively low frequency region. On the other hand, the second controller element 36 generates RRO compensation information for RRO components in the relatively high frequency region. Further, the present embodiment is characterized in that the frequency characteristic of the second controller element 36 is designed such that the gain gradually approaches 1 in the high frequency region and that the PES is output as is in the high frequency region. This allows for generation of RRO compensation information tailored to a servo system model.

As described above, the present embodiment generates partial and individual RRO compensation information for each of the different frequency regions in response to RRO taking place and combines these pieces of individual RRO compensation information to generate RRO compensation information. This allows for generation of RRO compensation information that can expand the disturbance frequency range in which to compensate for RRO.

It should be noted that the position error detection unit 32 may apply a peak filter 37 to the position error PES=(Pa−Pb)/(Pa+Pb) before outputting the position error rather than output the error as is. Here, it is preferred that the peak filter be designed such that the gain in the relatively high frequency region of 1 kHz or higher is smaller than the gain in the relatively low frequency region of less than 1 kHz. This provides improved servo margin (namely, servo control robustness). The reason for the above is that RRO components are primarily contained in the aforementioned low frequency region.

Figure 8:
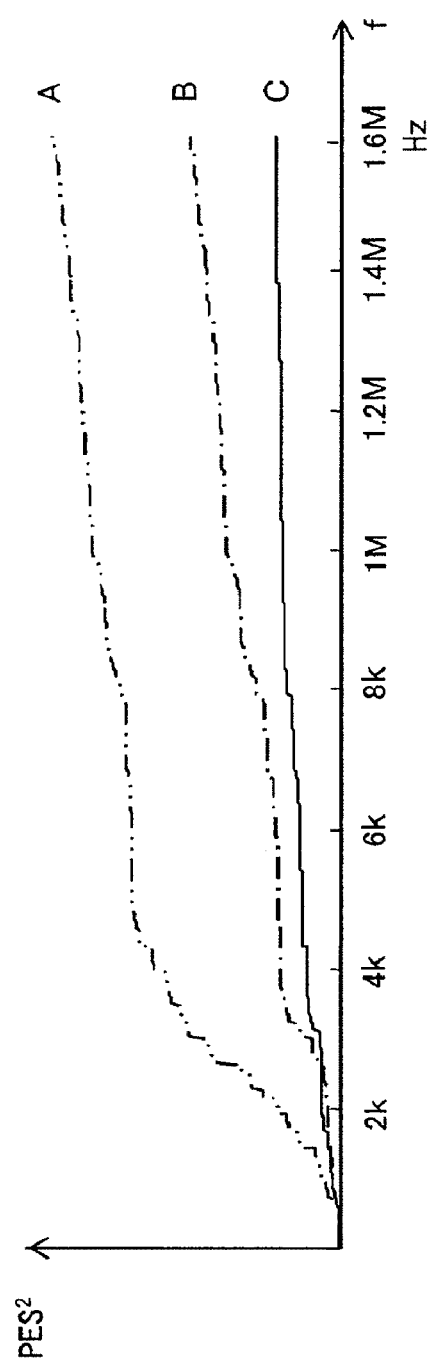
FIG. 8 is an explanatory view showing an example of operation of the magnetic recording apparatus according to an embodiment of the present invention.

FIG. 8 shows the accumulated intensity of each of the RRO frequency components when RRO compensation information generated by the present embodiment is used. FIG. 8 illustrates three cases for purposes of comparison, a case (A) in which no RRO compensation is conducted, a case (B) in which a conventional RRO compensation is conducted, and a case (C) in which RRO compensation is conducted using RRO compensation information 30 generated by the magnetic recording apparatus of the present embodiment.

As shown in FIG. 8, the conventional RRO compensation suppresses the RRO components at up to approximately 3 kHz, but fails to effectively suppress the RRO components in the frequency region of the order of 10 kHz. On the other hand, the RRO compensation according to the present embodiment ensures relatively effective suppression of RRO even in the frequency region beyond 10 kHz.

What is claimed is:

1. A magnetic recording apparatus comprising:
  a magnetic recording medium having tracks formed in a concentric or spiral manner and having at least one servo signal recorded on each of the tracks;
  a spindle motor adapted to rotate the magnetic recording medium;
  a magnetic head provided to be movable in the approximately radial direction of the magnetic recording medium and positioned over one of the tracks formed on the magnetic recording medium so as to read signals including the servo signal at the position;
  a compensation information generating circuit adapted to feed a position error signal of the magnetic head relative to the track, based on the servo signal read by the magnetic head, to each of a plurality of repetitive control systems each having a frequency characteristic different from each other, wherein the compensation information generating circuit is adapted to use the plurality of repetitive control systems to detect repeatable runout during the rotation of the magnetic recording medium for a frequency characteristic of each of the repetitive control systems, and wherein the compensation information generating circuit is adapted to generate individual compensation information so as to compensate for each of the detected repeatable runout, wherein
  compensation information based on the individual compensation information generated for each of the repetitive control systems is feedback to the position error signal to suppress the repeatable runout.

2. The magnetic recording apparatus of claim 1, wherein the compensation information generating circuit applies a peak filter to the position error signal before feeding the signal to each of the plurality of repetitive control systems.

3. The magnetic recording apparatus of claim 1, wherein the repetitive control systems include:
  systems having a characteristic obtained by multiplying a peak filter characteristic having peaks at integer multiples of the rotational frequency of the magnetic recording medium and a low pass filter characteristic in which a gain decreases with increase in frequency; and
  systems having both the peak filter characteristic having peaks at integer multiples of the rotational frequency of the magnetic recording medium and a characteristic in which the gain decreases with decrease in frequency.

* * * * *

UNITED STATES PATENT AND TRADEMARK OFFICE
CERTIFICATE OF CORRECTION

PATENT NO.       : 7,489,470 B2
APPLICATION NO.  : 11/725038
DATED            : February 10, 2009
INVENTOR(S)      : Uchida et al.

It is certified that error appears in the above-identified patent and that said Letters Patent is hereby corrected as shown below:

Column 8, Line 2, please delete "30".

<u>In the Formulas:</u>

[Formula 1] Column 5, Line 25 please delete "
$$\beta_1(k-N) = \frac{\sum_{i=0}^{N} a_i \bullet z^{-1}}{1 - \sum_{i=P}^{Q} b_i \bullet z^{-(M+1)}} \bullet CPE(k)$$
"

and insert --
$$\beta_1(k-N) = \frac{\sum_{i=0}^{N} a_i \bullet z^{-i}}{1 - \sum_{i=P}^{Q} b_i \bullet z^{-(M+1)}} \bullet CPE(k)$$
--

[Formula 2] Column 5, Line 48 please delete "
$$\beta_1(k-N) = \sum_{i=P}^{Q} b_i \bullet z^{-(M+1)} \bullet \beta_1(k-N-M) + \sum_{i=0}^{N} a_i \bullet z^{-1} \bullet CPE(k)$$
"

and insert --
$$\beta_1(k-N) = \sum_{i=P}^{Q} b_i \bullet z^{-(M+1)} \bullet \beta_1(k-N-M) + \sum_{i=0}^{N} a_i \bullet z^{-i} \bullet CPE(k)$$
--

UNITED STATES PATENT AND TRADEMARK OFFICE
CERTIFICATE OF CORRECTION

PATENT NO. : 7,489,470 B2
APPLICATION NO. : 11/725038
DATED : February 10, 2009
INVENTOR(S) : Uchida et al.

It is certified that error appears in the above-identified patent and that said Letters Patent is hereby corrected as shown below:

[Formula 2] Column 6, Line 5 please delete " $\beta_1(k-N) = \sum_{i=P}^{Q} b_i \bullet z^{-(M+1)} \bullet \beta_1(k-N-M) + \sum_{i=O}^{N} a_i \bullet z^{-1} \bullet CPE(k)$ "

and insert -- $\beta_1(k-N) = \sum_{i=P}^{Q} b_i \bullet z^{-(M+1)} \bullet \beta_1(k-N-M) + \sum_{i=O}^{N} a_i \bullet z^{-i} \bullet CPE(k)$ --

[Formula 3] Column 6, Line 24 please delete " $\beta_2(k-N) = b_O \bullet \beta_1(k-N-M) + \sum_{i=O}^{N} a_i \bullet z^{-1} \bullet CPE(k)$ "

and insert -- $\beta_2(k-N) = b_O \bullet \beta_1(k-N-M) + \sum_{i=O}^{N} a_i \bullet z^{-i} \bullet CPE(k)$ --

UNITED STATES PATENT AND TRADEMARK OFFICE
CERTIFICATE OF CORRECTION

PATENT NO. : 7,489,470 B2
APPLICATION NO. : 11/725038
DATED : February 10, 2009
INVENTOR(S) : Uchida et al.

It is certified that error appears in the above-identified patent and that said Letters Patent is hereby corrected as shown below:

[Formula 3] Column 6, Line 40 please delete " $\beta_2(k-N) = b_O \bullet \beta_1(k-N-M) + \sum_{l=O}^{N} a_i \bullet z^{-l} \bullet CPE(k)$ "

and insert -- $\beta_2(k-N) = b_O \bullet \beta_1(k-N-M) + \sum_{i=O}^{N} a_i \bullet z^{-i} \bullet CPE(k)$ --

Signed and Sealed this

Thirty-first Day of March, 2009

JOHN DOLL
*Acting Director of the United States Patent and Trademark Office*